United States Patent [19]
Kaneko et al.

[11] Patent Number: 5,972,516
[45] Date of Patent: Oct. 26, 1999

[54] METHOD FOR MANUFACTURING OPTICAL WAVEGUIDE USING SILOXANE POLYMER, AND OPTOELECTRONIC HYBRID SUBSTRATE USING THE OPTICAL WAVEGUIDE

[75] Inventors: Katsuhiro Kaneko; Shigeo Tanahashi, both of Soraku-gun, Japan

[73] Assignee: Kyocera Corporation, Kyoto, Japan

[21] Appl. No.: 08/807,620

[22] Filed: Feb. 27, 1997

[30] Foreign Application Priority Data

Feb. 29, 1996 [JP] Japan ..................................... 8-042519
Feb. 29, 1996 [JP] Japan ..................................... 8-042520

[51] Int. Cl.$^6$ ...................................................... B32B 9/00
[52] U.S. Cl. .......................... 428/429; 385/131; 385/143; 385/145; 428/411.1
[58] Field of Search .................................... 385/131, 143, 385/145; 428/411.1, 429

[56] References Cited

U.S. PATENT DOCUMENTS 5,062,680   11/1991   Imamura et al. .
5,672,672   9/1997   Amano et al. ........................... 385/145

FOREIGN PATENT DOCUMENTS 566301   3/1993   Japan .
6109936   4/1994   Japan .

*Primary Examiner*—Melvyn I. Marquis
*Attorney, Agent, or Firm*—Loeb & Loeb LLP

[57] ABSTRACT

An object of the invention is to provide a method of producing an optical waveguide comprising a siloxane-containing polymer film, capable of controlling a refractive index easily and finely, and an optoelectronic hybrid substrate using the optical waveguide, capable of controlling a refractive index easily and finely, and reducing the effect of the surface roughness of the substrate. In particular, it relates to a method of producing an optical waveguide comprising a siloxane-containing polymer film containing a metal obtained by the thermal polymerization of a siloxane-containing polymer film formation solution added with a metal alkoxide on a substrate, and an optoelectronic hybrid substrate comprising a combination of an optical waveguide produced as mentioned above, a photoelectric element and an electric circuit on a ceramic substrate.

11 Claims, 3 Drawing Sheets

METHOD FOR MANUFACTURING OPTICAL WAVEGUIDE USING SILOXANE POLYMER, AND OPTOELECTRONIC HYBRID SUBSTRATE USING THE OPTICAL WAVEGUIDE

BACKGROUND OF THE INVENTION

1. Field of the Invention

The invention relates to a method for manufacturing an optical waveguide comprising an optoelectronic integrated circuit (OEIC), an optical waveguide, an LSI for OEIC control, an IC and a high frequency electric circuit on one substrate and an optoelectronic hybrid substrate using the optical waveguide, more specifically to a manufacturing method of an optical waveguide using a siloxane polymer, and an optoelectronic hybrid substrate using the optical waveguide comprising a siloxane polymer.

2. Description of the Prior Art

In response to demand for information processing of higher speed in optical communication systems or computers, use of light in signal transmission between integrated circuit chips, between substrates on which integrated circuit chips are mounted, or between boards comprising a plurality of integrated circuit substrates, is studied. However, since processing of transmitted signals is conducted in electronic parts in the case where light is used for signal transmission, signal conversion between a light signal and an electric signal is necessary in such an optical information processing.

In a conversion area of a light signal and an electric signal, a light transmission path comprising an optical fiber or an optical waveguide, or an photoelectron conversion element such as a laser diode and a photodiode is used. Therefore, in a circuit for optical information processing, an optoelectronic integrated circuit (OEIC) comprising a combination of the light transmission path or the photoelectron conversion element, a photoelectric element and an electronic circuit, an optical integrated circuit (optical IC) for processing information only with a light wave, an integrated circuit for controlling an electronic element or processing an electric signal, such as an IC or an LSI, and a high frequency electric circuit for driving an electronic part at a high speed coexist.

Hitherto, a module assembled with individual optical parts and electronic parts has been used as a photoelectron conversion element. Further, a light source system comprising a gas laser as a light source, and an optical system comprising a prism, a lens and a mirror was used. Recently, a comapct type optical system comprising a laser diode, a photodiode, an optical fiber and a rod lens has been used. And now research and development have been conducted strenuously for the practical use of an optoelectronic hybrid substrate, comprising an OEIC or an optical IC, an optical waveguide, an integrated circuit such as an LSI for OEIC control, and a high frequency electric circuit on one substrate.

According to the optoelectronic hybrid substrate, owing to high density integration, reduction of electric power, higher speed, higher reliability, improvement of mass productivity, easier assembly, and improvement of the stability after assembly can be achieved. However, in order for realizing an optoelectronic hybrid substrate, technology for forming an optical waveguide on a ceramic substrate, or a substrate comprising a thin film circuit laminated on a ceramic electric circuit substrate is necessary.

In the optical waveguide, precise control on a refractive index is necessary for a single mode light transmission. And for forming an optical waveguide, in particular, processing of a core portion and control of a refractive index of a core portion and a clad portion. For example, a typical specification for a silica-based single mode waveguide includes a core size of 7 $\mu$m×7 $\mu$m, the difference between a refractive index of the core portion and that of a clad portion of about 0.25%.

As a method of forming an optical waveguide, a method of preparing a core portion by forming an optical thin film of an appropriate thickness and applying a pattern processing thereto is generally used. As a method of forming an optical thin film, known methods include a CVD method, a FHD(Flame Hydrolysis Deposition) method, a vacuum evaporation method, a sputtering method, and an SOG (spin on glass) method. Among these examples, an SOG method is drawing attention since the method allows a thin film formation at a comparatively low temperature in a short time at a low cost.

In a sol-gel method using alkoxy silane as a starting material, which is an SOG method, a substantially complete inorganic silica can be obtained. However, it is difficult to obtain a film having a thickness of a several $\mu$m or more in the method due to a large volume shrinkage at the time of depositing a film to generate a crack. Therefore the method has a problem of difficulty in the application in the production of a silica-based single mode optical waveguide where a thickness of at least 15 $\mu$m is required for the core and clad portions. Further, there is another problem of a large internal stress of an obtained film, which causes a birefringence.

On the other hand, use of organic materials such as polyimide, PMMA (polymethyl methacrylate) and polycarbonate in addition to silica as a material of an optoelectronic hybrid substrate is advocated. Although knownforeasy film formation and a low cost, these organic materials have problems such as a high transmission loss and a high loss at a portion connecting with an optical fiber due to a refractive index larger than a silica-based material. Besides, these material excluding polyimide have problems such as high water absorption, a low decomposition temperature and a low glass transition point.

In the case polyimide fluoride is used as an optical waveguide material, there is a problem that a Fresnel reflection loss at the time of connecting with a silica-based optical fiber becomes larger due to a large difference between a refractive index of polyimide fluoride, which is about 1.53 and a refractive index of a silica, which is about 1.44. Besides, there is another problem of difficulty in connecting with a silica-based single mode optical fiber due to a multi mode light transmission.

Japanese Unexamined Patent Publication JP-A 5-66301 (1993) discloses an optical waveguide material comprising siloxane-containing polymer and an optical material using thereof, which allows easier control on a refractive index in combination with another element substituting a silicon element. The disclosure suggests a method of changing a refractive index of an unsubstituted polymer by partially substituting a tetravalent element except silicon or a trivalent element except rare earth elements for a silicon element in a siloxane-containing polymer in a substitution method for obtaining an aimed siloxane polymer by hydrolysis and polymerization of a silane chloride and a chloride of an element to be substituted, such as Al.

The method has a problem of difficulty in reaction control since highly reactive materials are mixed. Therefore there is a problem that a sophisticated technology and an expensive equipment are necessary for producing a stable mixture with an optional mixing ratio.

The Japanese Unexamined Patent Publication JP-A 6-109936 (1994) and the U.S. Pat. No. 5,062,680 disclose an optical waveguide comprising a deuterated or halogenated siloxane polymer. The siloxane-containingpolymer allows easy processing and a low loss in the range of a visible light and an infrared light in producing an optical waveguide. However, the use of deuterium causes increase of the cost and the use of a halogen element, which is highly active, causes a problem in handling.

In general, various conditions are required for an optical waveguide, such as a smooth film surface of an optical waveguide with a surface roughness (Ra) of at least $\frac{1}{10}$ or less of a light source wavelength to be used, which is preferable for achieving a low propagation loss in the formation of a core portion, optional setting of an internal refractive index in the production of an optical waveguide particularly in the production of a single mode optical waveguide, where a fine refractive index control is required, an excellent flatness after film formation regardless of the unevenness or surface roughness of a base substrate in the case where an optical waveguide is formed on a thin film circuit substrate, adherence with a base substrate, and a heat resistance in mounting an optical device such as a laser diode or a photodiode or an electronic device such as an LSI by soldering in the case of formation of an optoelectronic hybrid substrate. Therefore, in order to achieve an practical use of an optoelectronic hybrid substrate, an optical waveguide allowing easy control of a refractive index produced In an SOG method with a simple equipment, and a production method thereof have been called for.

SUMMARY OF THE INVENTION

The invention was made in light of the problems of the prior arts. Accordingly, an object of the invention is to provide a method for manufacturing an optical waveguide comprising a siloxane polymer preferably applied to an optoelectronic hybrid substrate, having a refractive index close to a refractive index of silica, which can be controlled stably and easily, an excellent flatness with a small surface roughness after film formation regardless of the unevenness or the surface roughness of a base substrate surface, an excellent adherence with a base substrate, and a sufficient heat resistance with respect to soldering with simple equipment in a short time at a low cost.

Another object of the invention is to provide an optoelectronic hybrid substrate formed on a ceramic substrate, having a refractive index close to a refractive index of silica, which can be controlled stably and easily, an excellent flatness with a small surface roughness after film formation regardless of the unevenness or the surface roughness of a base substrate surface, an excellent adherence with a base substrate, and a sufficient heat resistance (heat stability with respect to thermal decomposition) with respect to soldering with simple equipment in a short time at a low cost.

Still another object of the invention is to provide a photoelctron hybrid substrate including an optical waveguide having the above-mentioned excellent characteristics, capable of achieving high density integration, low electric power and high speed. excellent reliability and mass productivity, easy assembly, excellent stability after assembly and high performance.

The invention provides a method for manufacturing an optical waveguide using a slloxane-containing polymer, comprising thermal polymerizing a solution for forming a siloxane-containing polymer film, the solution being added with a metal alkoxide on a substrate, to form an optical waveguide composed of the siloxane-containing polymer film containing metal.

According to the manufacturing method of an optical waveguide of the invention, since mixing with an optional mixing ratio can be allowed by the addition of a metal alkoxide to a comparatively stable siloxane-containing polymer as a material of an optical waveguide and the value of a refractive index of an optical waveguide comprising a siloxane-containing polymer film containing metal obtained by thermal polymerization of the material can be optionally set according to the amount of the metal alkoxide, a fine control of the refractive index can be realized in the production of a single mode optical waveguide. Besides, since an internal stress of an obtained film is small owing to a small volume shrinkage by heat processing in film formation, even with a film thickness of 15 $\mu$m or more, there is no liability of generating a crack or causing birefringence. Furthermore, since a siloxane-containing polymer having a refractive index substantially the same as that of silica is used, an optical waveguide having a high coupling efficiency with respect to a silica-based optical fiber can be obtained. Consequently, by the use of a production method of an optical waveguide of the invention, film formation with an SOG method at a comparatively low temperature in a short time at a low cost can be enabled and an optical waveguide allowing highly efficient connection with a silica-based single mode optical fiber can be obtained.

Moreover, since a solution is applied on a substrate in the production method, the surface of the applied solution becomes smooth regardless of the surface condition of a base substrate and a volume shrinkage in cure process is small, an optical waveguide having an excellent flatness can be obtained.

Furthermore, since an optical waveguide of the invention comprises a siloxane bond (—Si—O—Si—) as a main chain, an excellent heat resistance can be achieved.

The invention is characterized in that the substrate includes a copper polyimide substrate, a ceramic substrate, a multilayer ceramic electric circuit substrate, a thin film multilayer circuit substrate or a silicon circuit substrate.

Such substrate has been conventionally used as a substrate for mounting electronic parts. Particularly the copper polyimide substrate and thin film multilayer circuit substrate are used as a so-called for-multichip substrate, of which good electrical high frequency characteristic is required. By forming the optical waveguide of the invention on the substrate for mounting electronic parts having good characteristics as an electric circuit board, it is made possible to perform not only electrical interconnection, but also optical interconnection on one and the same substrate, with the result that high-density assembly on combining of mixture of the electronic device and the optical device.

Since a surface of the substrate is formed to have irregularities or to be optically uneven and the surface condition has an effect on the formation of an optical waveguide, in an optical waveguide of the prior art it is difficult to form a good optical waveguide. On the other hand, according to the invention, a shrinkage in cure process a siloxane-containing polymer film is small, and therefore, when a solution for forming the siloxane-polymer film is applied, the even condition of the substrate is maintained. Accordingly it is made possible to form a highly even optical waveguide regardless of surface condition.

Furthermore, the invention provides an optoelectronic hybrid substrate comprising an optical waveguide, an optoelectronic integrated circuit or optical integrated circuit which comprises a combination of a photoelectric element and an electronic circuit, and an integrated circuit or a high frequency electric circuit on a ceramic substrate, wherein the waveguide comprises a siloxane-containing polymer film obtained by the thermal polymerization of a solution for forming a siloxane-containing polymer film added with a metal alkoxide on the substrate.

According to the optoelectronic hybrid substrate of the invention, since mixing with an optional mixing ratio can be allowed by the addition of a metal alkoxide to a comparatively stable siloxane-containing polymer as a material of an optical waveguide and the value of a refractive index of an optical waveguide comprising a siloxane-containing polymer film containing a metal obtained by thermal polymerization of the material can be optionally set according to the amount of the metal alkoxide, fine control of the refractive index can be realized in the production of a single mode optical waveguide. Besides, film formation with the SOG method at a comparatively low temperature in a short time at a low cost can be enabled. Moreover, since an internal stress of an obtained film is small owing to a small volumetric shrinkage by heat processing in film formation, even with a film thickness of 15 µm or more, there is no liability of generating a crack or causing birefringence. Furthermore, since a siloxane-containing polymer having a refractive index substantially the same as that of silica is used, an optical waveguide having a high coupling efficiency with respect to a silica-based optical fiber can be obtained.

Moreover, since the optical waveguide is applied with a solution on a substrate in the manufacturing method, the surface of the applied solution becomes smooth regardless of the surface condition of a base substrate and a volumetric shrinkage in cure process is small, an optical waveguide having excellent flatness and surface roughness can be obtained. Furthermore, since an optical waveguide of the invention comprises a siloxane bond (—Si—O—Si—) as a main chain. an excellent heat resistance can be achieved. And thus an optical waveguide of the invention is suitable for an optoelectronic hybrid substrate on a ceramic substrate to provide a high performance optoelectronic hybrid substrate.

Further, according to the invention, a siloxane-containing polymer film containing no metal is interposed between the ceramic substrate and the optical waveguide.

According to the invention, since the siloxane-containing polymer film containing no metal is interposed between the ceramic substrate and the optical waveguide, owing to the existence of the siloxane-containing polymer containing no metal between the ceramic substrate and the optical waveguide, even in the case where the surface unevenness or the surface roughness of a ceramic substrate is larger than the above case, since the siloxane-containing polymer containing no metal formed on the substrate is formed by applying a solution as a siloxane-containing polymer containing a metal of the invention, and is also excellent in the surface flatness, effect of the surface unevenness or the surface roughness of the substrate can be reduced. Accordingly, an optical waveguide having a further excellent flatness can be formed, and it is also advantageous in terms of further strengthen the adherence between the substrate and the optical waveguide.

The invention is characterized in that the metal of the metal alkoxide is at least one selected from the group including titanium (Ti), germanium (Ge) and erbium (Er), and it was confirmed by an experiment of the inventor that fine control of the refractive index and amplifying function of a waveguide light can be achieved.

Furthermore, the invention is characterized in that the metal alkoxide is at least one selected from the group including tetra-n-butoxytitanium, tetramethoxytitanium, tetrapropoxytitanium, tetramethoxygermanium, tetraethoxygermanium, tetrapropoxygermanium and trimethoxyerbium.

The metal alkoxides may be diluted with an alcohol, whereby uniform mixing with the siloxane-containing polymer is facilitated, and further uniform application to the substrate and film formation are made possible.

Additionally, in the case where titanium and germanium are contained, the electron density of siloxane polymer increases due to the titanium and germanium contained, and therefore the refractive index increases in comparison with the siloxane-containing polymer itself. Accordingly, by taking advantage of the feature, control of the refractive index of the siloxane polymer by a content of metals in the siloxane polymer can be achieved.

Additionally, in the case where erbium is contained, in addition to the effect of the change in refractive index the same in titanium and germanium, a further effect of availability as a light amplifying medium in a band of 15 µm utilizing transition derived from an energy level which erbium atoms originally possess is obtained.

The invention is characterized in that the siloxane-containing polymer film formation solution comprises a mixture solution of a siloxane-containing polymer having a phenyl group or a methyl group as an end group and a propylene glycol monomethyl ether.

In general, when silica is produced by the sol-gel method, a gel porous material is produced by dehydration condensation polymerization between silanol groups of silicon alkoxide, excess of the solvent and residual alkoxy groups are volatilized by heating and sintering, and densification of silica glass is carried out by strengthening the binding. When the temperature of heating and sintering is low, the residual of hydroxyl groups, namely silanol groups, which accompany with silicon, is large. Since the residual silanol groups cause increase of infrared absorption, the material is not preferable as a material for a optical waveguide. In order to reduce the residual silanol groups, heating over 500° C. is required, however, such a high temperature damages the electric circuit substrate used in the invention.

According to the constitution of the invention, it is possible to relatively reduce the residual hydroxyl groups by configuring a phenyl groups or methyl group as an end group of the syloxane-containing polymer. Additionally, because of the resinous property of phenyl group or methyl group, namely their high strength and flexibility, it is possible to form a high-density film having a hardness enough to manufacture a waveguide even at a low temperature below 300° C.

Further, it is necessary to use an appropriate solvent in consideration of mixing property with the siloxane-containing polymer, application property to the substrate, solvent elimination property in cure process, handling etc. Propylen-glykol-monomethylether indicated an enough wettability, while other solvents did not. Accordingly propylen-glycol-monomethylether is a suitable solvent, and a uniform and smooth siloxane-containing polymer film could be formed by the use of the same.

Further, the invention is characterized in that the metal alkoxide is added to the siloxane-containing polymer film formation solution after diluted with alcohol identical to alkoxy of the metal alkoxide.

When the metal alkoxide is added to the siloxane-containing polymer film formation solution and mixed, dealcoholization polycondensation or dehydrogenation polycondensation of residual hydroxyl groups in the siloxane-containing polymer and residual alkoxy groups in the metal alkoxide in producing the siloxane-containing polymer is carried out. In the case where the concentration of the metal alkoxide is high, since vigorous polycondensation occurs in the solution in mixing, gelation may occur.

On the other hand, by diluting the metal alkoxide with an alcohol corresponding to the alkoxy group a stable metal alkoxide/alcohol solution can be obtained. Accordingly by gradually adding the diluted metal alkoxide/alcohol solution to the siloxane-containing polymer film formation solution, uniform mixing is facilitated, and it is made possible to obtain a uniform mixture solution without gelation.

According to the method for manufacturing of an optical waveguide using a siloxane-containing polymer of the invention, since an optical waveguide comprising a siloxane-containing polymer film containing a metal is formed by the thermal polymerization of a siloxane-containing polymer formation solution added with a metal alkoxide on the substrate, an optical waveguide having a refractive index close to a refractive index of silica, which can be controlled stably, easily and finely can be obtained.

According to the method for manufacturing an optical waveguide using a siloxane-containing polymer of the invention, an optical waveguide comprising a siloxane-containing polymer preferably applied to an optoelectronic hybrid substrate having an excellent flatness with a small surface roughness after film formation regardless of the unevenness or the surface roughness of a base substrate surface, an excellent adherence with a base substrate, and a sufficient heat resistance with respect to soldering is provided with simple equipment in a short time at a low cost.

According to the optoelectronic hybrid substrate of the invention, since the optical waveguide comprising a siloxane-containing polymer film containing a metal is formed and provided by the thermal polymerization of a siloxane-containing polymer formation solution added with a metal alkoxide on the substrate, the optical waveguide with a refractive index close to a refractive index of silica, which can be controlled stably, easily and finely, an excellent flatness with a small surface roughness after film formation regardless of the unevenness or the surface roughness of a base substrate surface, an excellent adherence with a base substrate, and a sufficient heat resistance with respect to soldering is provided with simple equipment in a short time at a low cost. Therefore, an optical waveguide preferably applied to an optoelectronic hybrid substrate, capable of achieving high density integration, low electric power and high speed, excellent reliability and mass productivity, easy assembly, excellent stability after assembly and a high performance can be provided.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
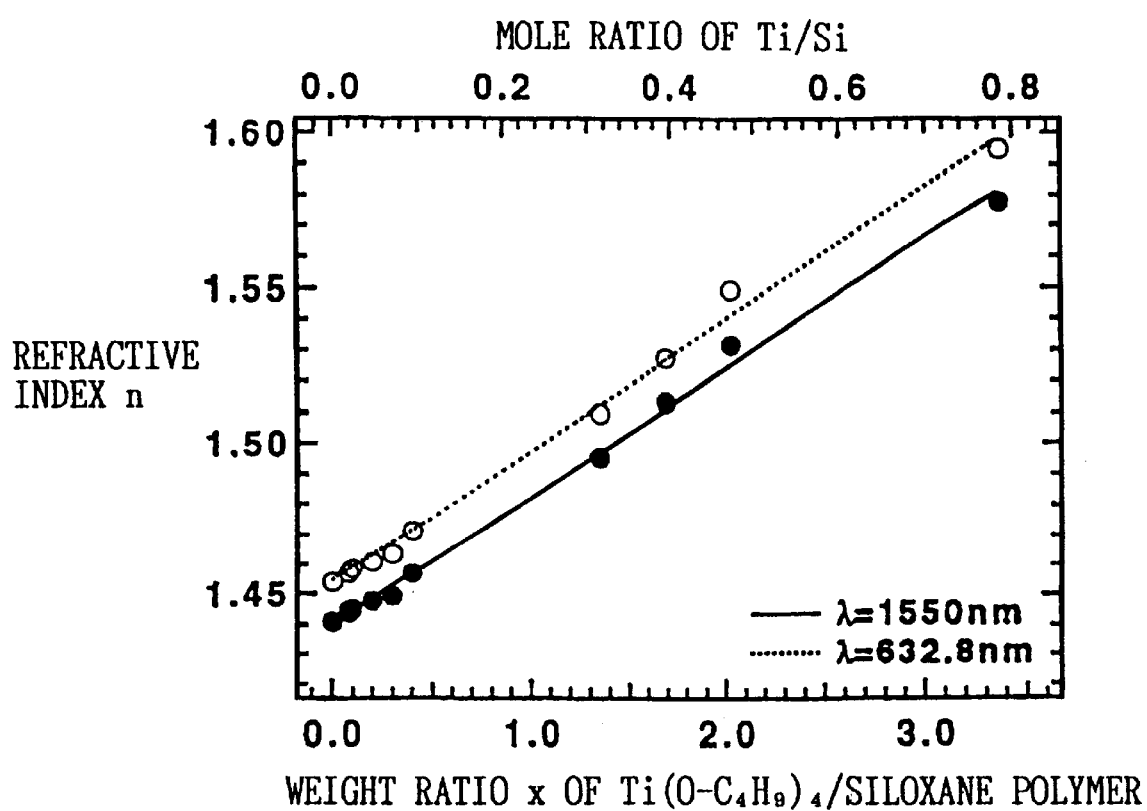
FIG. 1 is a graph showing the relationship between the weight ratio of the solid component of tetra-n-butoxytitanium and a siloxane-containing polymer solution and the refractive index of the film in a siloxane-containing polymer film containing a metal comprising an optical waveguide of the invention.

Now referring to the drawings, preferred embodiments of the invention are described below.

Examples of a siloxane-containing polymer film formation solution used in the production of an optical waveguide of an optoelectronic hybrid substrate of the invention include a mixture solution of a siloxane-containing polymer having a phenyl group or a methyl group as an end group or a siloxane-containing polymer having an alkyl group such as butyl group and propyl group, an aryl group such as phenyl group or tolyl group, a functional group partially substituted with fluorine, or hydroxyl group as an end group; and propylene glycol monomethyl ether, 3-methoxy-3-methyl-1-butanol or ethylene glycol monobutyl ether, and the like. Among these examples, a mixture solution of a siloxane-containing polymer having a phenyl group or a methyl group as an end group and propylene glycol monomethyl ether is preferable.

Furthermore, examples of a metal alkoxide to be added to a siloxane-containing polymer film formation solution include tetra-n-butoxytitanium, tetramethoxytitanium, tetrapropoxytitanium, tetramethoxygermanium, tetraethoxygermanium, tetrapropoxygermanium, tetrabutoxygermanium and trimethoxyerbium. Among alcoholates of the same metal kind, an alcoholate having a larger C (carbon) number is superior to an alcoholate having a smaller C number in terms of chemical stability, allowing easy mixing without liability of gelation, and thus it is preferable.

By adding a metal alkoxide to a siloxane-containing polymer film formation solution accordingly, a siloxane-containing polymer film containing a metal can be formed by a reaction more stable than a method of direct reaction of monomers as conventionally proposed, and a metal alkoxide can be added and mixed to a siloxane-containing polymer film formation solution by an optional ratio, and thus precise control of the refractive index of an optical waveguide can be enabled.

Furthermore, a siloxane-containing polymer film containing a metal obtained by the invention has a configuration comprising a portion where a metal alkoxide becomes a metal oxide and remains as it is and a portion where the metal alkoxide is chemically included in the polymer. Owing to the configuration different from that of the film having a metal partially substituted with Si atom of a siloxane-containing polymer, obtained by the method disclosed in the Japanese Unexamined Patent Publication JP-A 5-66301(1993), the refractive index can be controlled more easily.

It is preferable to set the amount of the metal alkoxide at a preferable amount based on the preliminary measurement of a refractive index of a polymer film with respect to the amount of a metal alkoxide concerning each siloxane-containing polymer film formation solution of each combination of the materials mentioned above.

Moreover, examples of addition method and conditions include a method of diluting an alcoholate with a sufficient amount of alcohol and mixing with a siloxane-containing polymer film formation solution while conducting reflux. The alcohol used herein is preferably identical to the alkoxy of the alcoholate.

A silica-type siloxane-containing polymer coated film can be obtained by applying the siloxane-containing polymer film formation solution on a substrate such as a copper polyimlde substrate, an Si substrate, a ceramic substrate, a multilayer ceramic electric circuit substrate, a thin film multilayer circuit substrate and an Si circuit substrate with an application method such as a spin coating method, a dip coating method and a roller coating method, and a heating treatment with an oven or a hot plate for thermal polymerization to facilitate crosslinking reaction of the siloxane bond.

Herein a heat treatment temperature for thermal polymerization is about 270° C., and thus sufficiently low with respect to the decomposition temperature of polyimide commonly used as an insulating layer for a thin film circuit substrate on which an optical waveguide is formed in the invention (typical value is about 450° C.), an optical waveguide can be formed without damaging on the base substrate such as the thin film circuit substrate by the heat treatment.

Examples of a base substrate comprising an optical waveguide include, as mentioned above, a copper polyimide substrate, an Si substrate, a ceramic substrate, a multilayer ceramic electric circuit substrate, a thin film multilayer circuit substrate and an Si circuit substrate. Concerning the state of the surface on which an optical waveguide is formed, in either cases that it is optically smooth and flat without unevenness or surface roughness, or that unevenness or surface roughness of the base substrate is conspicuous, since the shrinkage at the time of cure process is small and thus the flatness at the time of applying a siloxane-containing polymer film formation solution can be maintained, an optical waveguide having an excellent flatness can be formed.

The flattening effect was examined by forming a line pattern having a 4 μm height and 20 to 60 μm width and pitch on a substrate and forming a siloxane-containing polymer film of the invention. In the case a siloxane-containing polymer film having a 4 μm thickness was formed, the height of the unevenness of the film surface became 0.15 μm or less. And in the case a siloxane-containing polymer film having an 8 μm thickness was formed, the height of the unevenness of the film surface became 0.07 μm or less. Therefore, a good improvement (flattening) effect was confirmed.

Furthermore, a siloxane-containing polymer film having a 4 μm thickness of the invention was formed on an alumina substrate having a surface roughness (Ra) of 0.23 μm. Then the surface roughness of the film surface was measured to be 0.026 μm. Accordingly, a surface flattening property as well as an excellent flattening effect were confirmed.

As heretofore mentioned, it was found that an optical waveguide having an excellent flatness can be obtained by the use of a siloxane-containing polymer film of the invention, regardless of the state of the substrate surface.

Besides, according to the results of an experiment of the inventor, since an adherence with the base substrate sufficient for lamination processing is provided, an optical waveguide having an excellent adherence with the base substrate can be obtained.

Since an optical waveguide comprising a siloxane-containing polymer film of the invention is provided, the optical waveguide with a refractive index close to a refractive index of silica, which can be controlled stably and easily, an excellent flatness with a small surface roughness after film formation regardless of the unevenness or the surface roughness of a base substrate surface, an excellent adherence with a base substrate, and a sufficient heat resistance with respect to soldering is provided with simple equipment in a short time at a low cost. Therefore, an optoelectronic hybrid substrate capable of achieving high density integration, low electric power and high speed, excellent reliability and mass productivity, easy assembly, excellent stability after assembly and a high performance can be provided.

Hereinafter embodiments of the invention are concretely described. Examples 1 to 5 describe formation and characteristics of a siloxane-containing polymer film, Example 6 describes formation of an optical waveguide, and Example 7 describes manufacturing of an optoelectronic hybrid substrate.

EXAMPLE 1

Formation and Characteristics of a Siloxane-containing Polymer Film

A siloxane polymer having a phenyl group and a methyl group as end groups is used as the siloxane-containing polymer. And 40 weight % of the siloxane polymer was mixed to propylene glycol monomethyl ether to prepare a siloxane-containing polymer solution for forming a silica-type coated film.

The solution was applied on an Si wafer substrate having a surface roughness (Ra) of 3 nm with a spin coating method in the condition of 1,500 rpm/15 seconds, then heat treated in the condition of 85° C./30 minutes+270° C./30 minutes in the atmosphere with a batch type oven for thermal polymerization to obtain a siloxane-containing polymer film having a 4 μm thickness.

The refractive index of the film was measured with a refractive index measuring device using a prism coupler to find it was 1.451 with respect to a light having a wavelength of 632.8 nm, and 1.441 with respect to a light having a wavelength of 1,550 nm.

The radius of curvature of the warp of the substrate after film formation was measured for measuring the internal stress of the film. It was found to be 20 MPa tensile stress, and thus extremely smaller than the compression stress of 160 MPa in an $SiO_2$ (silica) film formed with a sputtering method or the tensile stress of 100 MPa in an $SiO_2$ film formed with a sol-gel method.

Furthermore, by the examination of the film structure with an NMR (nuclear magnetic resonance), a structure represented by the following chemical formula 1 was found:

(1)

In the chemical formula 1, R denotes $—CH_3$ or $—C_6H_5$. In the siloxane-containing polymer film, 35.5 weight % of Si, 18.0 weight % of $CH_3$, and 16.2 weight % of $C_6H_5$ were contained.

Furthermore, the water absorption of the film was measured. Since the main chain comprises a siloxane bond, the water absorption was 1% or less, which is significantly small. The moisture resistance was evaluated in the conditions of 2 atm, 120° C., 100% RH and 100 hours. The result shows no change in terms of outside appearance or adherence.

The surface roughness (Ra) of the siloxane-containing polymer film was measured to be 4 nm, which is sufficiently small as the roughness of the core wall surface of an optical waveguide.

Furthermore, the heat stability of the film was evaluated by the thermogravimetry and the FT-IR (Fourier transform infrared absorption spectroscopic analysis). It was found to have a heat stability of 400° C. or more, and thus capable of enduring the soldering temperature at the time of mounting a chip element in the case of being used in an optical waveguide of an optoelectronic hybrid substrate.

The siloxane-containing polymer film was formed on a polyimide film, and a Cu wire was soldered on a 1 mm×1 mm Cu/Mo dot pattern formed on the film. Then by measuring the load by pulling vertically upward with a load cell, an adhesion strength of the interface was sought by measuring the load at which the film was peeled off at the interface. The obtained average figure was 2.2 kgf/mm$^2$, which is a sufficient adherence for forming an optical waveguide on a polyimide substrate.

As heretofore mentioned, it was confirmed that a siloxane-containing polymer is suitable as a material for an optical waveguide of an optoelectronic hybrid substrate.

EXAMPLE 2

Formation of a Siloxane-containing Polymer Film Containing Ti

A mixture solution of 1.91 g of tetra-n-butoxytitanium (Ti(O—C$_4$H$_9$)$_4$) and 5 ml of n-butanol, and 5 g of the siloxane-containing polymer solution of Example 1 (solid component 1.50 g) were mixed and stirred to obtain a transparent siloxane-containing polymer film formation solution. The solution was applied on an Si wafer having a 4 inch diameter with a spin coating method in the condition of 200 rpm/2 seconds+1,500 rpm/10 seconds, then heat treated in the condition of 85° C./30 minutes+300° C./30 minutes in the atmosphere with a batch type oven for thermal polymerization to obtain a transparent film having a 1.6 μm thickness comprising siloxane-containing polymer containing Ti.

The refractive index of the siloxane-containing film containing a metal was measured with a refractive index measuring device using a prism coupler to find it was 1.5114 with respect to a light having a wavelength of 632.8 nm.

The radius of curvature of the warp of the substrate after film formation was measured for measuring the internal stress of the film. It was found to be 20 MPa tensile stress, and thus extremely small.

Furthermore, as in Example 1, the surface roughness of the film was measured. It was found to be Ra=2 nm, which is sufficiently small as the roughness of the core wall surface of an optical waveguide.

Besides, the heat stability of the film was evaluated as in Example 1. It was found to have a heat stability of 400° C. or more, and thus capable of enduring the soldering temperature at the time of mounting a chip element in the case of being used in an optical waveguide of an optoelectronic hybrid substrate.

The siloxane-containing polymer film containing a metal was formed on a polyimide film, and an adhesion strength of the interface of the films was measured as in Example 1. The obtained average figure was 2.2 kgf/mm$^2$, which is a sufficient adherence for forming an optical waveguide on a polyimide substrate.

As heretofore mentioned, it was confirmed that a siloxane-containing polymer containing a metal of the invention is suitable as a material for an optical waveguide of an optoelectronic hybrid substrate.

EXAMPLE 3

Formation of a Siloxane-containing Polymer Film Containing Ti

A mixture solution of 4.78 g of tetra-n-butoxytitanium and 5 ml of butanol, and 5 g (solid component 1.50 g) of the siloxane-containing polymer solution of Example 1 were mixed and stirred to obtain a transparent siloxane-containing polymer film formation solution. The solution was applied on an Si wafer having a 4 inch diameter with a spin coating method in the condition of 200 rpm/2 seconds+1,500 rpm/10 seconds, then heat treated in the condition of 85° C./30 minutes+300° C./30 minutes in the atmosphere with a batch type oven for thermal polymerization to obtain a transparent film having a 0.96 μm thickness comprising siloxane-containing polymer containing Ti.

The refractive index of the siloxane-containing film containing a metal was measured with a refractive index measuring device using a prism coupler to find it was 1.5949 with respect to a light having a wavelength of 632.8 nm.

The internal stress of the film was found to be 20 MPa tensile stress and the water absorption was found to be 1% or less, and thus extremely small. Besides, the surface roughness of the film was found to be Ra=2 nm, which is sufficiently small as the roughness of the core wall surface of an optical waveguide.

Besides, concerning the heat stability and the adhesion strength at the interface of this film with the poly-imide film, preferable results as in Example 1 and Example 2 were obtained.

As heretofore mentioned, it was confirmed that a siloxane-containing polymer containing a metal of the invention is suitable as a material for an optical waveguide of an optoelectronic hybrid substrate.

EXAMPLE 4

Ti Content and Refractive Index of a Siloxane-containing Polymer Film Containing Ti Siloxane-containing polymer film formation solutions including different amounts of tetra-n-butoxytitanium as in Example 2 and Example 3 were prepared to form a several kinds of siloxane-containing polymer films containing Ti. Then the refractive index of the respective film was measured.

From the results, a relationship shown in the graph of FIG. 1 was found between the weight ratio of tetra-n-butoxytitanium and a solid component of a siloxane-containing polymer solution, and the refractive index of the obtained film. In FIG. 1, the lower horizontal axis denotes the weight ratio x of tetra-n-butoxytitanium (Ti(O—C$_4$H$_9$)$_4$) and the solid component of a siloxane-containing polymer solution, the upper horizontal axis denotes the molar ratio of the corresponding Ti and Si (silicon), and the vertical axis denotes the refractive index n of a siloxane-containing polymer film containing Ti obtained from the film formation solutions. The mark ○ and the dot line in FIG. 1 denotes a measured figure of the refractive index with respect to a light having a wavelength of 632.8 nm and the characteristic curve, and the mark ● and the solid line denotes a measured figure of the refractive index with respect to a light having a wavelength of 1,550 nm and the characteristic curve.

From the results shown in FIG. 1, a linear relationship is observed between the weight ratio x of tetra-n-butoxytitanium and the solid component of a siloxane-containing polymer solution, and the refractive index n of the obtained film. According to the results of this example, the relationship between x and n can be provided by the formula; n=0.04436x+1.451 with respect to a light having a wavelength of 632.8 nm, and the formula: n=0.04406x+1.439 with respect to a light having a wavelength of 1,550 nm.

EXAMPLE 5
Structure of a Siloxane-containing Polymer Film Containing Ti

In order to examine the structure of siloxane-containing polymer films obtained in Examples 2 to 4, the FR-IR measurement was conducted with a siloxane-containing polymer film formation solution of Example 3. As a consequence, absorption caused by an —Si—O—Ti— bond was observed. Furthermore, increase thereof caused by the heat treatment was also observed. This is attributed to the dehydration polymerization between silanol and tetra-n-butoxytitanium to generate an —Si—O—Ti— bond.

Moreover, the structure of a siloxane-containing polymer film containing Ti of Example 3 was examined with NMR. The film was found to have a structure represented by the chemical formula 1 (however, R denotes —$CH_3$ or —$C_6H_5$, and the molar ratio of $CH_3/C_6H_5$ in the siloxane-containing polymer film of Example 3 was 5.7), and a structure represented by the chemical formula 2 mentioned below:

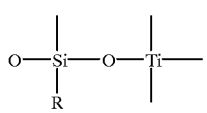

(2)

A siloxane-containing polymer film of Japanese Unexamined Patent Publication JP-A 5-66301(1993) starts from a synthesis of a monomer, and has a structure with elements other than Si, such as Al and Ti incorporated in molecules. On the other hand, since a siloxane-containing polymer film of the invention is prepared by mixing a metal alkoxide with a siloxane polymer, although a part of the metal is incorporated in the polymer, the other part of the metal remains in the polymer as a single substance of metal oxide. Therefore, the invention differs from Japanese Unexamined Patent Publication JP-A 5-66301(1993) in terms of the structure.

EXAMPLE 6
Formation of an Optical Waveguide

In the production process shown in FIG. 2, an optical waveguide comprising a siloxane-containing polymer film containing a metal was formed by the thermal polymerization of a siloxane-containing polymer film formation solution added with a metal alkoxide on the substrate. FIGS. 2A to 2D are cross-sectional views to illustrate an embodiment of the production process.

Figure 2A:
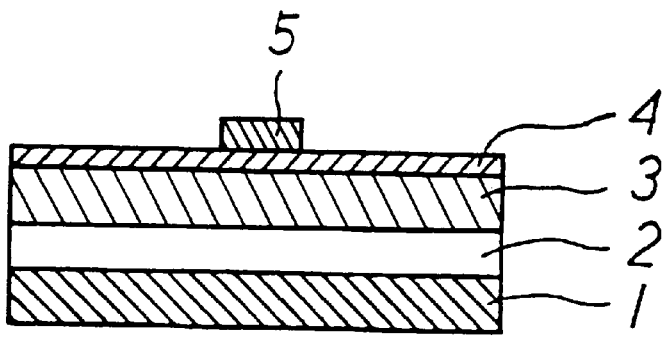
FIGS. 2A to 2D are cross-sectional views showing an embodiment of the production process of an optical waveguide comprising a siloxane-containing polymer film containing a metal of the invention.

In FIG. 2A, the numeral 1 denotes a substrate such as a thin film circuit substrate. In this example, an Si wafer was used as the substrate. The numeral 2 denotes a clad layer formed by applying a siloxane-containing polymer solution of Example 1 on the substrate 1, and applied with a heat treatment with the conditions of 85° C./30 minutes+270 ° C./30 minutes. The clad layer 2 has a thickness of 5 μm, and the refractive index with respect to a light having a wavelength of 1,550 nm of 1.4405.

The numeral 3 denotes a core layer comprising a siloxane-containing polymer film containing a metal (Ti), formed on the clad layer 2 in the process the same as Example 2 with a siloxane-containing polymer film formation solution containing a metal prepared with the weight ratio of tetra-n-butoxytitanium/solid component of a siloxane-containing polymer solution of 0.082. The core layer 3 has a thickness of 7 μm, and the refractive index with respect to a light having a wavelength of 1,550 nm of 1.4437.

The numeral 4 denotes a metal layer, which is formed on the core layer 3 with the sputtering method, and provides a mask at the time of processing the core layer 3. In this example, an Al layer having a thickness of 0.5 μm was used. Further, the numeral 5 denotes a resist pattern, which provides a pattern for the core layer 3, having a line width of 1 to 15 μm, formed on the metal layer 4 with the photolithography method.

Figure 2B:
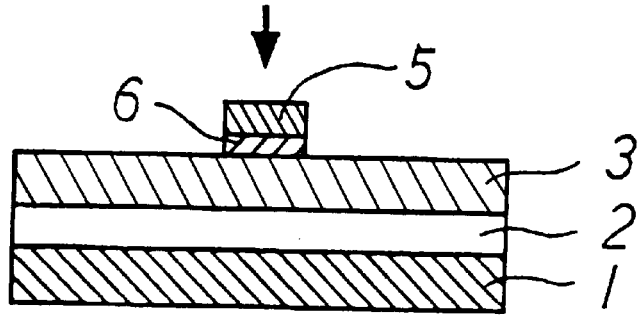

Then by etching of the Al layer 4 with a mixture solution of $H_3PO_4$, $CH_3COOH$ and $HNO_3$, an Al pattern 6 having the resist pattern 5 transferred was obtained as shown In FIG. 2B.

Figure 2C:
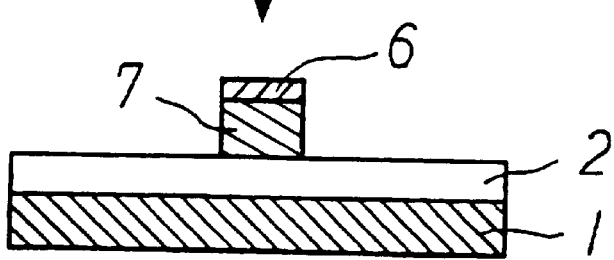

After the removal of the resist pattern 5, by the RIE (reactive ion etching), the core layer 3 was patterned. Herein the conditions of the RIE included an $O_2$ flow rate of 60 sccm, a reaction pressure of 5 Pa, and an RF output of 600 W. Accordingly, a core portion 7 having a substantially vertical side wall as shown in FIG. 2C was obtained.

Figure 2D:
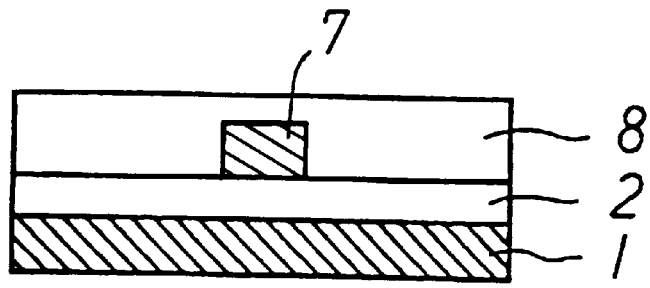

After removing the Al pattern 6, a second clad layer 8 was formed as the case of the clad layer 2 as shown in FIG. 2(d). The second clad layer 8 has a thickness of 15 μm, and the refractive index with respect to a light having a wavelength of 1,550 nm of 1.451.

As heretofore mentioned, an embedded type optical waveguide comprising a core portion with a height of 7 μm, and a refractive index with respect to a light having a wavelength of 1,550 nm of 1.4437, and a clad portion with a refractive index with respect to a light having a wavelength of 1,550 nm of 1.4405 was produced.

Optical waveguides having different core widths were produced in the same process. The near-field pattern (NFP) of the outputted light with respect to an incident light having a wavelength of 1,550 nm was observed, respectively. It was observed that optical waveguides having core widths of 8.5 μm or less functions particularly preferably in the single mode. Then the propagation loss was measured with a cut-back method. Results show 0.5 dB/cm, which is small, in either case.

As mentioned above, it was confirmed that an optical waveguide comprising a siloxane-containing polymer film containing a metal produced in a production method of the invention has excellent characteristics.

EXAMPLE 7
Formation of an Optoelectronic Hybrid Substrate

In the process the same as Example 6, an optical waveguide comprising a siloxane-containing polymer film containing a metal (Ti) was produced on a ceramic multilayer circuit substrate, and a coupler, an OEIC, a GaAs IC for controlling the OEIC, and an MPU for arithmetic processing were mounted to produce an optoelectronic hybrid substrate of the invention.

In the production of the optical waveguide, a siloxane-containing polymer solution of Example 6 was applied on a ceramic multilayer circuit substrate, and applied with a heat treatment in the conditions of 85° C./30 minutes+270° C./30 minutes to form a clad layer 2 comprising a siloxane-containing polymer film having a thickness of 5 μm and a refractive index with respect to a light having a wavelength of 1,550 nm of 1.4405.

Then a core layer 3 comprising a siloxane-containing polymer film containing a metal (Ti) having a thickness of 7 μm and a refractive index with respect to a light having a wavelength of 1,550 nm of 1.4437 was formed on the clad layer 2, using a siloxane-containing polymer film formation solution prepared with the weight ratio of tetra-n-butoxytitanium/solid component of the siloxane-containing polymer of 0.082.

Then a metal layer 4 comprising an Al layer having a thickness of 0.5 μm was formed on the core layer 3 with the sputtering method. Then a resist pattern 5 having a line width of 1 to 15 μm was formed with the photolithography.

Then by etching of the Al layer 4 with a mixture solution of $H_3PO_4$, $CH_3COOH$ and $HNO_3$, an Al pattern 6 having the resist pattern 5 transferred was obtained. After the removal of the resist pattern 5, by the RIE (reactive ion etching), the core layer 3 was patterned with the conditions of the RIE of an $O_2$ flow rate of 60 sccm, a reaction pressure of 5 Pa, and an RF output of 600 W to obtain a core portion 7 having a substantially vertical side wall.

After removing the Al pattern 6, a second clad layer 8, having a thickness of 15 μm and the refractive index with respect to a light having a wavelength of 1,550 nm of 1.451. was formed as the case of the clad layer 2. An embedded type optical waveguide comprising a core portion with a height of 7 μm, and a refractive index with respect to a light having a wavelength of 1,550 nm of 1.4437, and a clad portion with a refractive index with respect to a light having a wavelength of 1,550 nm of 1.4405 was produced.

A perspective view of an embodiment of an optoelectronic hybrid substrate of the invention, which comprises an optical waveguide comprising a siloxane-containing polymer film containing a metal produced as mentioned above is shown in FIG. 3.

Figure 3:
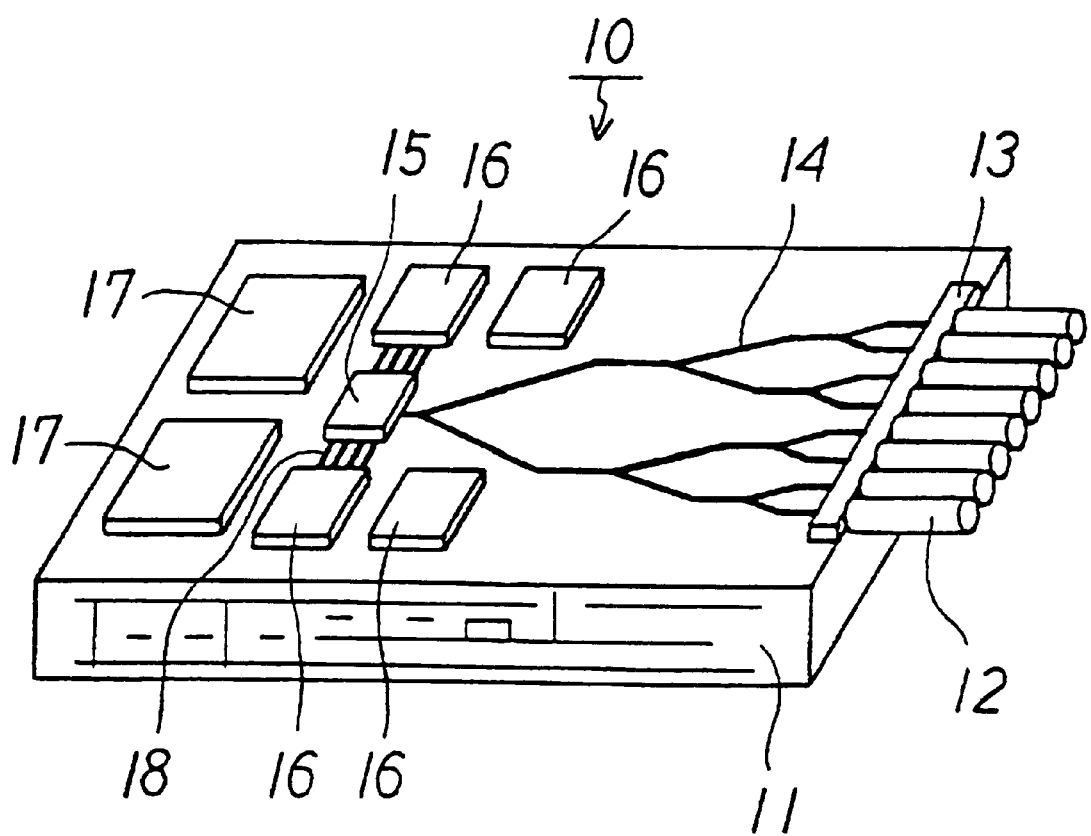
FIG. 3 is a perspective view showing an embodiment of an optoelectronic hybrid substrate provided with an optical waveguide using a siloxane-containing polymer of the invention.

FIG. 3 shows an embodiment of an optical waveguide 10, which is formed in a method mentioned above, comprising a ceramic multilayer circuit substrate 11, an optical fiber 12 for inputting and outputting an optical signal with the outside, a coupler 13 for connecting the optical fiber 12 with the multilayer circuit substrate 11, and an optical waveguide 14 comprising a siloxane-containing polymer film of the invention. By the optical waveguide 14, an optical signal from the optical fiber 12 is inputted to an OEIC 15, or an optical signal from the OEIC 15 is outputted to the optical fiber 12. Further, the numeral 16 denotes a GaAs IC for controlling the OEIC 15, and the numeral 17 denotes an MPU for arithmetic processing, both of which and the OEIC 15 are mounted on the multilayer circuit substrate 11 and connected with an electric transmission line 18 or a circuit wire in the multilayer circuit substrate 11.

Although a multilayer circuit substrate of an optoelectronic hybrid substrate 10 of the invention comprises a ceramic, another kind of substrate, such as a substrate comprising copper polyimide thin film can be used as a substrate comprising an optical waveguide of the invention.

According to an optoelectronic hybrid substrate 10, stable transmission of an optical signal with a small loss as well as a high density integration of the circuit can be achieved in a single mode optical waveguide 14, the refractive index thereof being precisely controlled, and thus optical information processing can be conducted with low electric power, high speed and high reliability, using an optical signal and an electric signal.

According to the invention, an optoelectronic hybrid substrate capable of achieving excellent reliability and mass productivity, easy assembly, excellent stability after assembly and a high performance can be provided.

The invention may be embodied in other specific forms without departing from the spirit or essential characteristics thereof. The present embodiments are therefore to be considered in all respects as illustrative and not restrictive, the scope of the invention being indicated by the appended claims which come within the meaning and the range of equivalency of the claims are therefore intended to be embraced therein.

What is claimed is:

1. A method for forming a film for an optical waveguide, comprising:

mixing a solution containing a metal alkoxide and a siloxane-containing polymer solution to obtain a film formation solution, the film formation solution containing a siloxane-containing polymer containing the metal of the metal alkoxide;

applying the film formation solution to a substrate to form a layer; and heating the layer to thermally polymerize the layer to form a film.

2. The method of claim 1, wherein the metal of the metal alkoxide is at least one selected from the group consisting of titanium (Ti), germanium (Ge) and erbium (Er).

3. The method of claim 2, wherein the metal alkoxide is at least one selected from the group consisting of tetra-n-butoxytitanium, tetramethoxytitanium, tetrapropoxytitanium, tetramethoxygermanium, tetraethoxygermanium, tetrapropoxygermanium and trimethoxyerbium.

4. The method of claim 1, wherein the siloxane-containing polymer solution comprises a mixture solution of a siloxane-containing polymer having a phenyl group or a methyl group as an end group and a propylene glycol monomethyl ether.

5. The method of claim 1, wherein the metal alkoxide is added to the siloxane-containing polymer solution after being diluted with an alcohol corresponding to the alkoxy of the metal alkoxide.

6. The method of claim 1, wherein the substrate is a copper polyimide substrate, a ceramic substrate, a multilayer ceramic electric circuit substrate, a thin film multilayer circuit substrate or a silicon circuit substrate.

7. The method of claim 1, wherein the siloxane-containing polymer containing the metal of the metal alkoxide contains a structure represented by the following chemical formula:

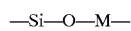

where M represents the metal of the metal alkoxide.

8. The method of claim 1, wherein the film has a polymer structure containing a structure represented by the following chemical formula (1):

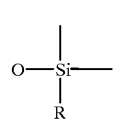

Where R represents an alkyl group, and a structure represented by the following chemical formula (2):

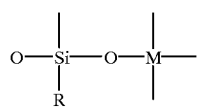

(2)

where M represents the metal of the metal alkoxide.

9. The method of claim 1, wherein the film further contains an oxide of the metal.

10. The method of claim 1, wherein in the mixing step the solution containing the metal alkoxide and the siloxane-containing polymer solution are mixed in a predetermined ratio, and wherein the film has a refractive index that depends on the predetermined ratio.

11. The method of claim 1, comprising the further step of forming another film from another siloxane-containing polymer solution on the substrate before applying the film formation solution.

* * * * *